Patented Jan. 12, 1937

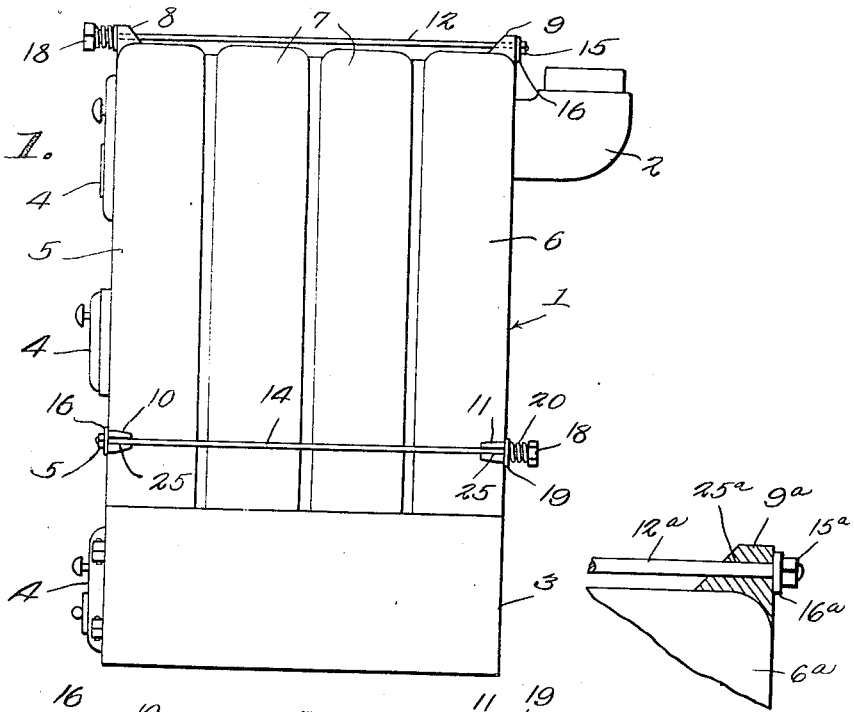
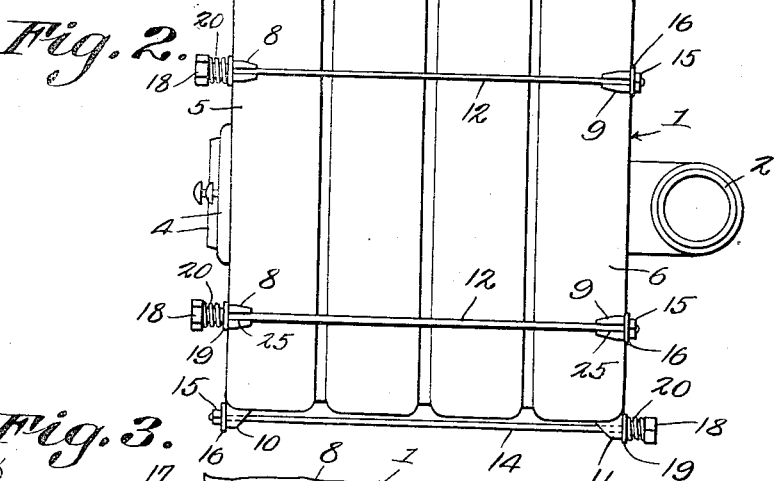
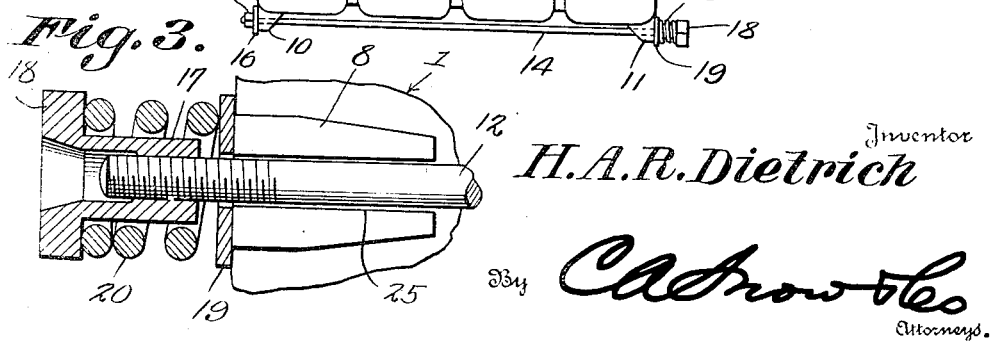

2,067,315

UNITED STATES PATENT OFFICE 2,067,315

COMPENSATOR FOR HEATING BOILERS

Harry A. R. Dietrich, Bethlehem, Pa.

Application August 17, 1935, Serial No. 36,727

1 Claim. (Cl. 122—225)

Most boilers used for heating houses, stores, apartments and the like, are made up of interfitting sections or units. Such units rust, where they are fitted together, the rust increases in thickness, connections are broken by the resulting increase in tension, and other damage results. So far as I know, the practice heretofore has been to replace damaged parts, at great expense of time and labor. I propose to provide a compensating connection between the units of a heating boiler of the class described, so that, even though rust accumulates, repairs will not be necessary.

A mechanic who keeps within the scope of what is claimed can make departures from the precise structure shown and described, without departing from the spirit of the invention.

Fig. 1 shows in side elevation, a device constructed in accordance with the invention, Fig. 2 is a top plan, and Fig. 3 is a fragmental top plan on an enlarged scale, with parts in section. Figure 4 is a sectional view showing a slight modification.

The numeral 1 marks a low pressure boiler, of the kind used for heating houses, shops, apartments and such places. The boiler has an outlet 2, a firebox 3, and the usual doors 4. The boiler may be made in various ways, the important thing to note being that it includes a front section 5, a rear section 6, and intermediate sections 7, the sections being arranged in interfitting relation.

The front section 5 and the rear section 6 are provided on top with front lugs 8 and with rear lugs 9. On the sides of the sections 5 and 6, near to the firebox 3, there are front lugs 10 and rear lugs 11. The lugs 8, 9, 10 and 11 may be located as desired. All of the lugs are slotted inwardly from their outer ends, as shown at 25.

Upper bolts 12 are placed in the slots of the lugs 8 and 9. Lower bolts 14 are placed in the slots of the lugs 10 and 11. The bolts 12 and 14 have heads 15. Washers 16 are introduced between the heads 15 of the bolts 12 and the lugs 9. Similar washers are introduced between the heads of the bolts 14 and the lugs 10. The bolts might be reversed from the position shown and described.

Tubular nuts 17 are threaded on the bolts 12 and 14 and have turning heads 18. Washers 19 are mounted on the bolts 12 and 14. Compression springs 20 surround the tubular nuts 17. The springs 20 abut against the turning heads 18 and the washers 19. The washers 19 on the bolts 14 are shown as engaging the lugs 11, and the washers 19 on the bolts 12 are shown as engaging the lugs 8.

The operator sets up the nuts 17 and puts the springs 20 under enough compression to hold the sections 5, 7 and 6 against leakage, but as rust accumulates between the interfitting portions of the sections, the springs 20 yield. The boiler therefore will remain for a long time in perfect working condition without expensive repairs. By noting the amount that the springs 20 have been compressed since the operator adjusted the nuts 17, he can ascertain approximately, at any time, the amount of rust accumulation that has taken place.

In Fig. 4, parts hereinbefore described have been designated by numerals already used, with the suffix "a". The modification consists in providing holes 25a in the lugs 9a etc., to receive the bolts 12a, the holes 25a replacing the slots 25.

What is claimed is:

A heating boiler comprising sections, including terminal sections having external lugs that are provided with slots extended inwardly from the outer ends of the lugs, bolts external to the sections and insertable transversely into the slots, the bolts having heads cooperating with the lugs of one terminal section, nuts threaded on the bolts, and compression springs interposed between the nuts and the adjacent lugs, the nuts having tubular portions extended into the springs throughout nearly the entire length of the springs and holding the springs in coaxial relation to the bolts, thereby avoiding a lateral component in the thrust of the springs which might tend to work the bolts out of the slots of the lugs as rust accumulates between the sections.

HARRY A. R. DIETRICH.